(12) United States Patent
Arisato

(10) Patent No.: US 6,644,331 B2
(45) Date of Patent: Nov. 11, 2003

(54) METHOD OF SUPPLYING AND DISCHARGING PRESSURIZED FLUID

(75) Inventor: Akira Arisato, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 10/266,266

(22) Filed: Oct. 8, 2002

(65) Prior Publication Data

US 2003/0066564 A1 Apr. 10, 2003

(30) Foreign Application Priority Data

Oct. 9, 2001 (JP) ........................................ 2001-310993

(51) Int. Cl.[7] ............................................... F16L 37/36
(52) U.S. Cl. .................. 137/1; 137/614.03; 137/614.06
(58) Field of Search ........................ 137/614.03, 614.06, 137/1

(56) References Cited

U.S. PATENT DOCUMENTS 4,989,630 A * 2/1991 Yonezawa ............... 137/614 X
5,462,084 A 10/1995 Arisato
6,390,126 B1 * 5/2002 Kimura ............. 137/614.03 X
6,564,829 B2 * 5/2003 Arisato .................. 137/614.03

FOREIGN PATENT DOCUMENTS

JP 3-47975 B2 7/1991

* cited by examiner

*Primary Examiner*—Kevin Lee
(74) *Attorney, Agent, or Firm*—Akin Gump Strauss Hauer & Feld, L.L.P.

(57) ABSTRACT

When supplying pressurized oil from a first port (51) to a second port (78), first, a pallet (2) is lowered to a table (1). And a first stop member (45) of a socket (21) is brought into butting contact with a second stop member (67) of a plug (22), thereby forming a contact gap (B) between the second stop member (67) and a check member (72) within a check valve chamber (70) of the plug (22). Next, the pallet (2) is fixed to the table (1) by a locking device (3). Subsequently, the pressurized oil at the first port (51) is supplied to the second port (78) via the check valve chamber (70) and thereafter is discharged to an exterior area.

2 Claims, 4 Drawing Sheets

METHOD OF SUPPLYING AND DISCHARGING PRESSURIZED FLUID

BACKGROUND OF THE INVENTION

1. Field of the Invention

The present invention relates to a method of supplying and discharging pressurized fluid and, for example, it concerns a method suitable for supplying and discharging pressurized oil to a work pallet which is detachably fixed to a table of a machine tool.

2. Explanation of Related Art

A conventional example of the pressurized fluid supply and discharge method of this kind was disclosed in Japanese Patent Publication No. 3-47975. The conventional technique is arranged as follows.

When connecting a quick coupler which comprises a socket and a plug, an air cylinder advances the socket toward the plug to thereby first seal a leading end of the socket and a leading end of the plug. Then a first stop member within the socket is brought into butting contact with a second stop member within the plug, thereby forcedly opening a first check member within the socket and a second check member within the plug. And the air cylinder exerts a pushing force, which holds the socket connected to the plug. In that state, pressurized oil is supplied from a first supply and discharge port of the socket to a second supply and discharge port of the plug.

The conventional technique has the following problem.

In the foregoing connected state, the first check member of the socket is always kept open as well as the second check member of the plug. Therefore, on stopping the pressurized oil supply to the first supply and discharge port, the pressurized oil at the second supply and discharge port is discharged to an exterior area through the first supply and discharge port. In consequence, in order for the second supply and discharge port to hold its pressure even after the socket has been separated from the plug, the socket has to be separated from the plug with the pressurized oil supplied to the first supply and discharge port. This results in easy leakage of the pressurized oil from the sealed portion of the leading ends of the socket and of the plug.

SUMMARY OF THE INVENTION

The present invention aims at making it possible to prevent the leakage of pressurized fluid when separating a coupler.

In order to accomplish the above aim, for example, as shown in FIGS. 1 to 4, the present invention provides a method which connects a first coupling 21 fixed to a first block 1, to a second coupling 22 secured to a second block 2 and separates from each other, thereby supplying and discharging pressurized fluid between a first supply and discharge port 51 of the first block 1 and a second supply and discharge port 78 of the second block 2. The method comprises the following steps.

When supplying the pressurized fluid from the first supply and discharge port 51 to the second supply and discharge port 78, first, the first block 1 and the second block 2 are brought closer to each other, thereby hermetically communicating a first flow passage 44 within the first coupling 21 with a second flow passage 66 within the second coupling 22. And a first stop member 45 within the first flow passage 44 is brought into butting contact with a second stop member 67 within the second flow passage 66. A contact gap (B) is formed between the second stop member 67 in that butting contact state and a check member 72 within the second coupling 22. Next, the second block 2 is fixed to the first block 1 by a locking means 3 under a locking condition (X). In that state, pressurized fluid is supplied to the first supply and discharge port 51, thereby supplying the pressurized fluid to the second supply and discharge port 78 via the first flow passage 44, the second flow passage 66, an interior area of a check valve seat 71 and a check valve chamber 70. Subsequently, a resilient member 73 exerts an urging force which brings the check member 72 into closing contact with the check valve seat 71. Thereafter, the pressurized fluid at the first supply and discharge port 51 is discharged to an exterior area. And the locking means 3 is switched over from the locking condition (X) to an unlocking condition (Y), thereby separating the first block 1 and the second block 2 from each other.

Contrary to the above, when discharging the pressurized fluid supplied to the second supply and discharge port 78, to the first supply and discharge port 51, first, the first block 1 and the second block 2 are brought closer to each other, thereby hermetically communicating the first flow passage 44 with the second flow passage 66 and bringing the first stop member 45 into butting contact with the second stop member 67. Then the second block 2 is fixed to the first block 1 by the locking means 3 under the locking condition (X). In that state, an actuation means 59 separates the check member 72 from the check valve seat 71 through the first stop member 45 and the second stop member 67 in the mentioned order, thereby discharging the pressurized fluid at the second supply and discharge port 78 to the first supply and discharge port 51 via the check valve chamber 70, the interior area of the check valve seat 71, the second flow passage 66 and the first flow passage 44. Thereafter, the locking means 3 is switched over from the locking condition (X) to the unlocking condition (Y), thereby separating the first block 1 and the second block 2 from each other.

The present invention offers the following advantages.

After the pressurized fluid has been supplied from the first supply and discharge port of the first block to the second supply and discharge port of the second block, the check member within the second coupling is brought into closing contact with the check valve seat by the resilient member. Therefore, even if the pressurized fluid at the first supply and discharge port is discharged to the exterior area, it is possible to retain a pressure of the second supply and discharge port at a predetermined one. And the first coupling and the second coupling are separated from each other in a state where the first flow passage and the second flow passage have lost their pressures by discharging the pressurized fluid at the first supply and discharge port to the exterior area. Therefore, it is possible to prevent the leakage of the pressurized fluid upon that separation.

Besides, at the time of the foregoing separation, the first flow passage has lost its pressure. Accordingly, the pressurized fluid does not make its pressure act from the first coupling to the second coupling, so that there is no need for receiving a force exerted by the pressurized fluid.

The present invention includes the following method.

The actuation means 59 comprises a piston 54 which faces the first stop member 45, and an actuation chamber 56. And when the pressurized fluid is supplied from the first supply and discharge port 51 to the second supply and discharge port 78, first, pressurized fluid for forced valve-opening is supplied to the actuation chamber 56. This separates the check member 72 from the check valve seat 71 via the piston 54, the first stop member 45 and the second stop member 67. The pressurized fluid supplied to the first supply and discharge port 51 is supplied to the second supply and discharge port 78. Next, the pressurized fluid for forced valve-opening within the actuation chamber 56 is discharged to an exterior area. Thereafter, the pressurized fluid at the first supply and discharge port 51 is discharged to the exterior area.

The above-mentioned invention produces the following function and advantages.

On supplying the pressurized fluid from the first supply and discharge port to the second supply and discharge port, the check member is forcedly opened, thereby being able to secure a large opening gap over the entire term for supplying the pressurized fluid. This makes it possible to carry out the supply of the pressurized fluid for a short period of time. In addition, the forcedly opened check member can inhibit the chattering caused by pressure pulsation, which results in the possibility of preventing a valve face or a valve seat from being damaged. Thus it is possible to keep the checking performance in a good condition over a long period of time.

Besides, since the foregoing advantage can be achieved by utilizing the above-mentioned existing actuation means, there is no need for adding a new construction to result in being able to put the present invention into practice with a simple construction inexpensively.

BRIEF DESCRIPTION OF THE DRAWINGS

FIG. 1 is a schematic view when seen in vertical section, which shows a state where a socket provided in a table of a machine tool is connected to a plug provided in a work pallet;

FIG. 2 is a vertical sectional view showing the socket and the plug separated from each other;

FIG. 3 is a vertical sectional view showing the socket and the plug connected to each other; and FIG. 4 shows a state where a piston provided in the socket forcedly opens a check member within the plug and is a vertical sectional view similar to FIG. 3.

DESCRIPTION OF THE PREFERRED EMBODIMENTS

Hereafter, an embodiment of the present invention is explained with reference to FIGS. 1 to 4.

This embodiment exemplifies a case where the present invention is applied to a method of supplying and discharging pressurized oil between a table of a machining center and a work pallet.

Figure 1:
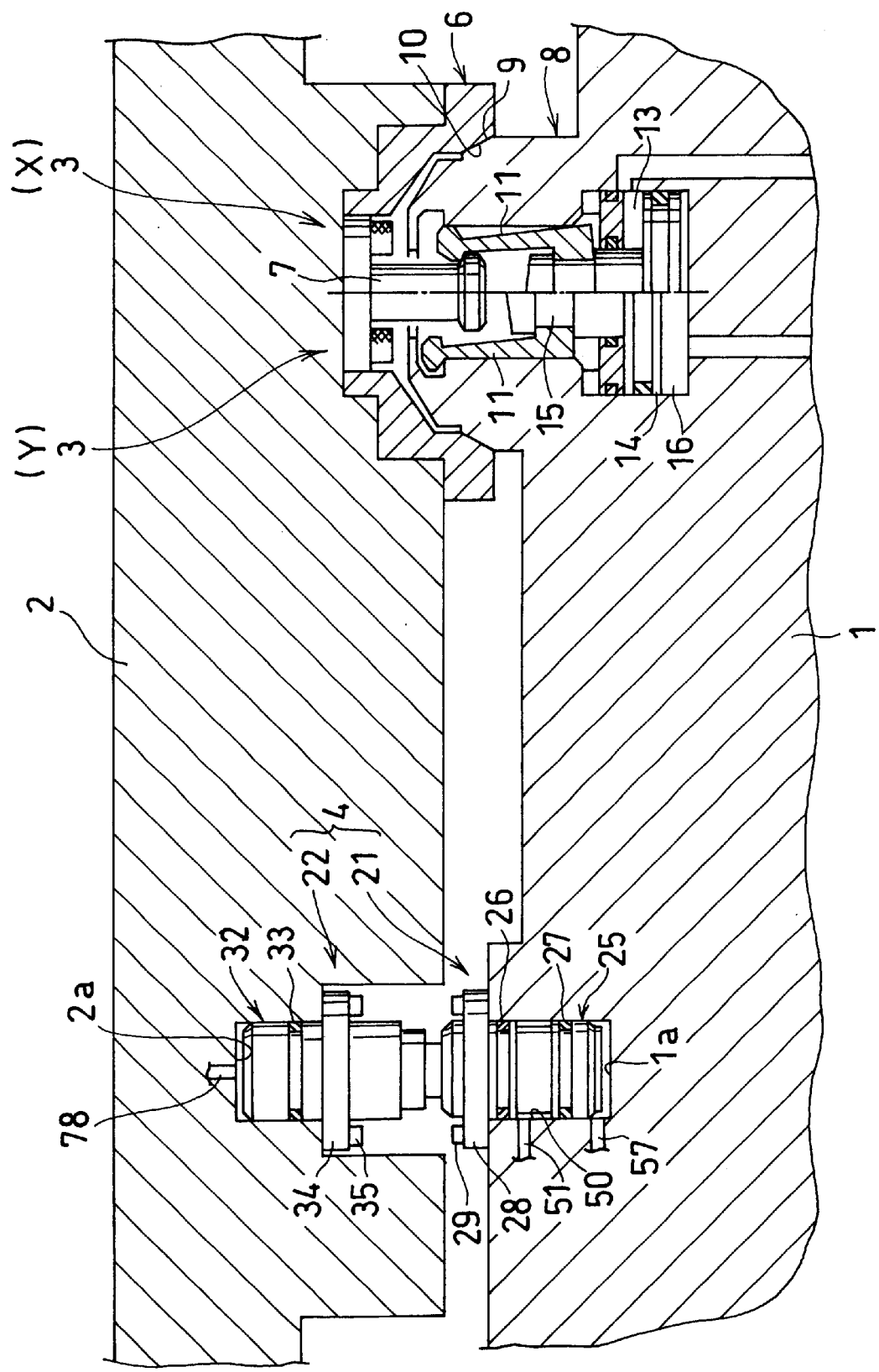
FIGS. 1 to 4 show an embodiment of the present invention.

First, an explanation is given for a whole structure of a supply and discharge apparatus to which the above-mentioned supply and discharge method is applied, by relying on the schematic view of FIG. 1.

Plural sets of locking means 3 and plural sets of quick couplers 4 are provided over a table (first block) 1 of a machining center and a work pallet (second block) 2. There are arranged hydraulic clamps and workpieces (either of which are not shown) on an upper surface of the work pallet 2. And pressurized oil is supplied to or discharged form these hydraulic clamps through the quick couplers 4, thereby being able to fix and unfix the workpieces.

Here, either of the locking means 3 and the quick coupler 4 is illustrated only in one set.

The locking means 3 is constructed as follows.

Concentrically fixed to a lower portion of the work pallet 2 are a tapered sleeve 6 and a pull rod 7. A support cylinder 8 projects upwards from the table 1. The support cylinder 8 has a tapered peripheral surface 9 which receives a tapered peripheral surface 10 provided at a lower portion of the tapered sleeve 6. The support cylinder 8 has a cylindrical hole within which a large number of collet chucks 11 are arranged peripherally.

Under a locking condition (X) shown in a right half view of the locking means 3, pressurized oil supplied to an upper hydraulic chamber 13 downwardly pulls the pull rod 7 through a piston 14, a piston rod 15 and the collet chucks 11. This positions and fixes the work pallet 2 to the support cylinder 8. On the other hand, under an unlocking condition (Y) shown in a left half view of the locking means 3, pressurized oil supplied to a lower hydraulic chamber 16 obliquely and upwardly retreats the collet chucks 11 through the piston 14 and the piston rod 15, thereby allowing the work pallet 2 to ascend.

The quick coupler 4 comprises a socket (first coupling) 21 fixed to the table 1 and a plug (second coupling) 22 secured to the work pallet 2.

The table 1 has an upper surface concaved to form an accommodation bore 1a, into which a first housing 25 of the socket 21 is inserted hermetically by an upper and a lower sealing members 26, 27. The first housing 25 has a flange 28 fixed to the table 1 through a plurality of bolts 29.

The work pallet 2 has a lower surface concaved to form an accommodating bore 2a, into which a second housing 32 of the plug 22 is inserted hermetically by a sealing member 33. The second housing 32 has a flange 34 secured to the work pallet 2 through a plurality of bolts 35.

And, as shown in FIG. 1, the work pallet 2 is lowered to the table 1, thereby connecting the quick coupler 4. Next, the locking means 3 is switched over from the unlocking condition (Y) to the locking condition (X). In that state, pressurized oil is supplied or discharged between the table 1 and the work pallet 2 through the quick coupler 4.

Figure 2:
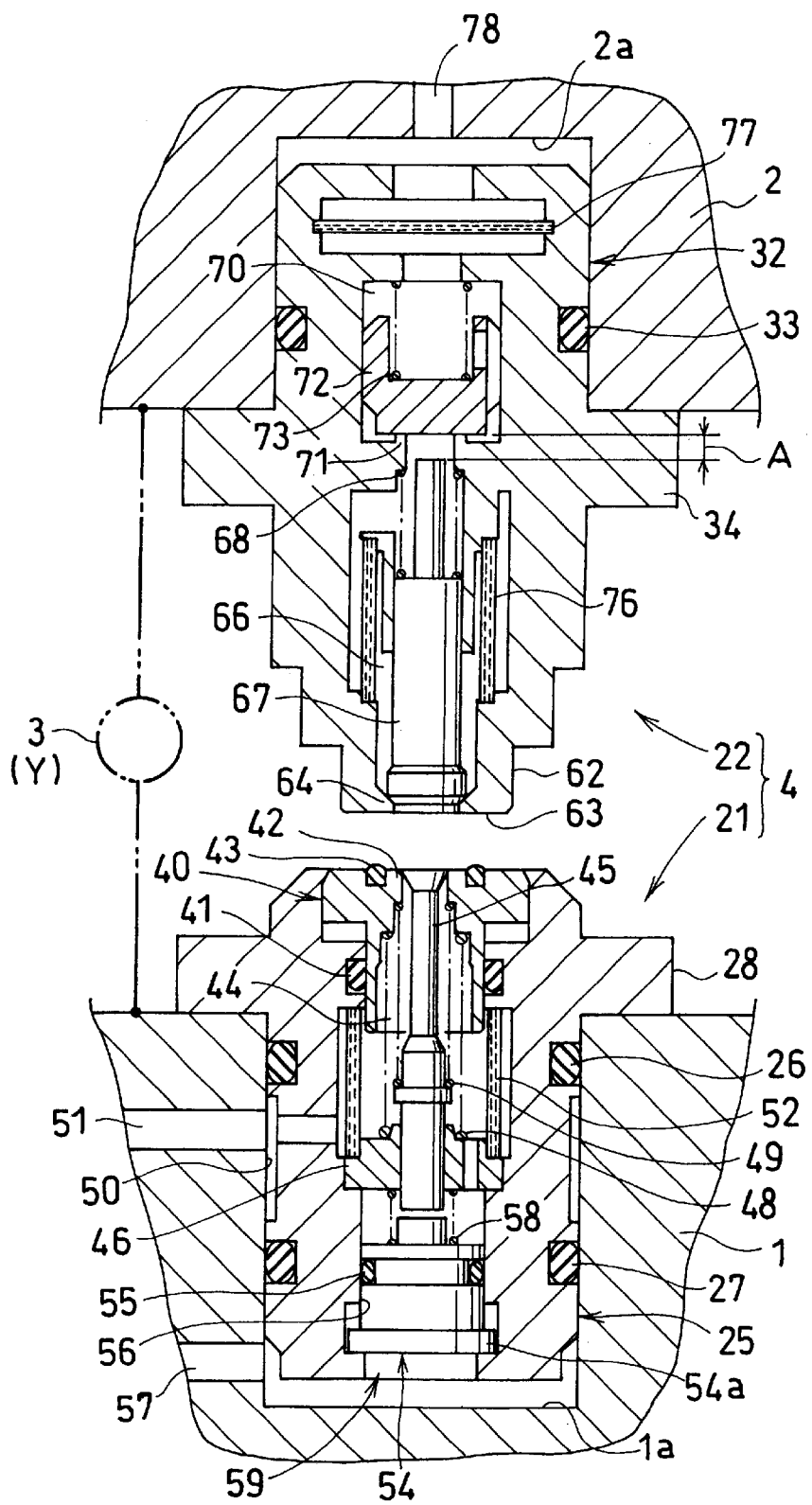

A concrete structure of the quick coupler 4 is explained by resorting to the vertical sectional view of FIG. 2.

The socket 21 is constructed as follows.

The first housing 25 has an upper portion, into which a slide cylinder 40 is vertically movably and hermetically inserted through an O-ring 41. The slide cylinder 40 has a cylindrical hole at a leading end of which a first stop valve seat 42 is formed. An annular sealing member 43 is provided around the first stop valve seat 42.

Inserted into a first flow passage 44 within the slide cylinder 40 is a first stop member 45 a lower portion of which is supported by a sleeve 46. The slide cylinder 40 is urged upwards by a first advance spring 48, and a first closing spring 49 exerts an urging force by which the first stop member 45 has its upper end brought into closing contact with the first stop valve seat 42.

The first flow passage 44 communicates with a first supply and discharge port 51 via a peripheral groove 50 formed between the sealing members 26 and 27. Numeral 52 designates a first cylindrical filter.

The first housing 25 has a lower portion, into which a piston 54 is inserted hermetically through an O-ring 55. The piston 54 faces a lower end of the first stop member 45 from below with a predetermined gap interposed therebetween. An actuation chamber 56 which is formed below the O-ring 55, communicates with another supply and discharge port 57.

An actuation means 59 is composed of the piston 54, the actuation chamber 56 and a return spring 58.

The plug 22 is constructed as follows.

The second housing 32 has a lower portion provided with a push cylinder 62. The push cylinder 62 has an under surface formed with a sealing surface 63 which opposes to the annular sealing member 43. The push cylinder 62 has a cylindrical hole at a lower portion of which a second stop valve seat 64 is provided.

The second housing 32 has a lower half portion within which a second flow passage 66 is provided. A second stop member 67 is inserted into the second flow passage 66 vertically movably. The second stop member 67 has a lower end brought into closing contact with the second stop valve seat 64 by a second closing spring 68.

The second housing 32 has an upper half portion within which a check valve chamber 70 and a check valve seat 71 are vertically arranged one on another. A check member 72 inserted into the check valve chamber 70 is brought into closing contact with the check valve seat 71 by a check spring (resilient member) 73. And in a state of this FIG. 2, a separation gap (A) is formed between the check member 72 and the second stop member 67.

Reference numerals 76, 77 and 78 indicate a second cylindrical filter, a disk filter, and a second supply and discharge port, respectively.

Figure 3:
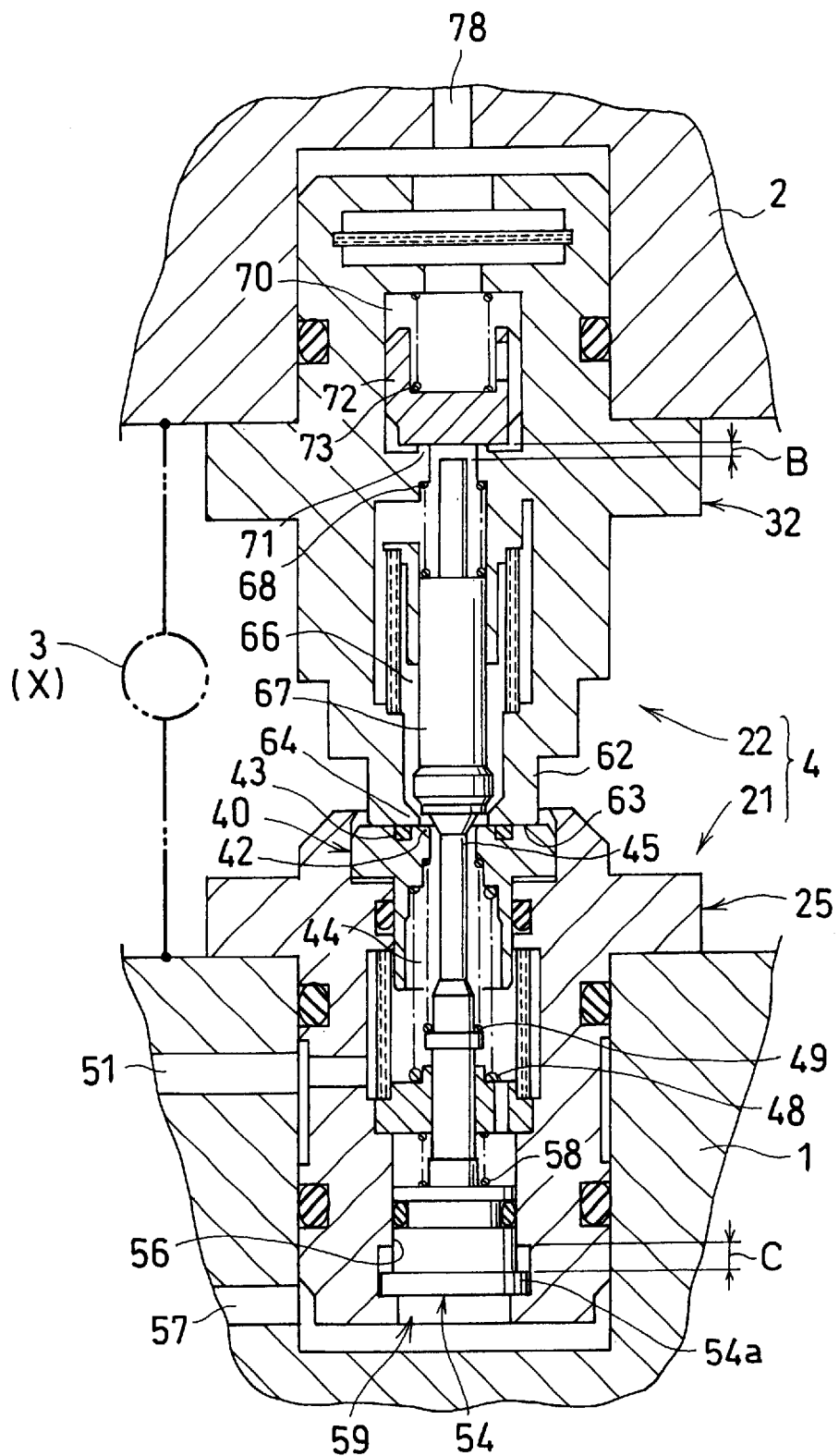
Figure 4:
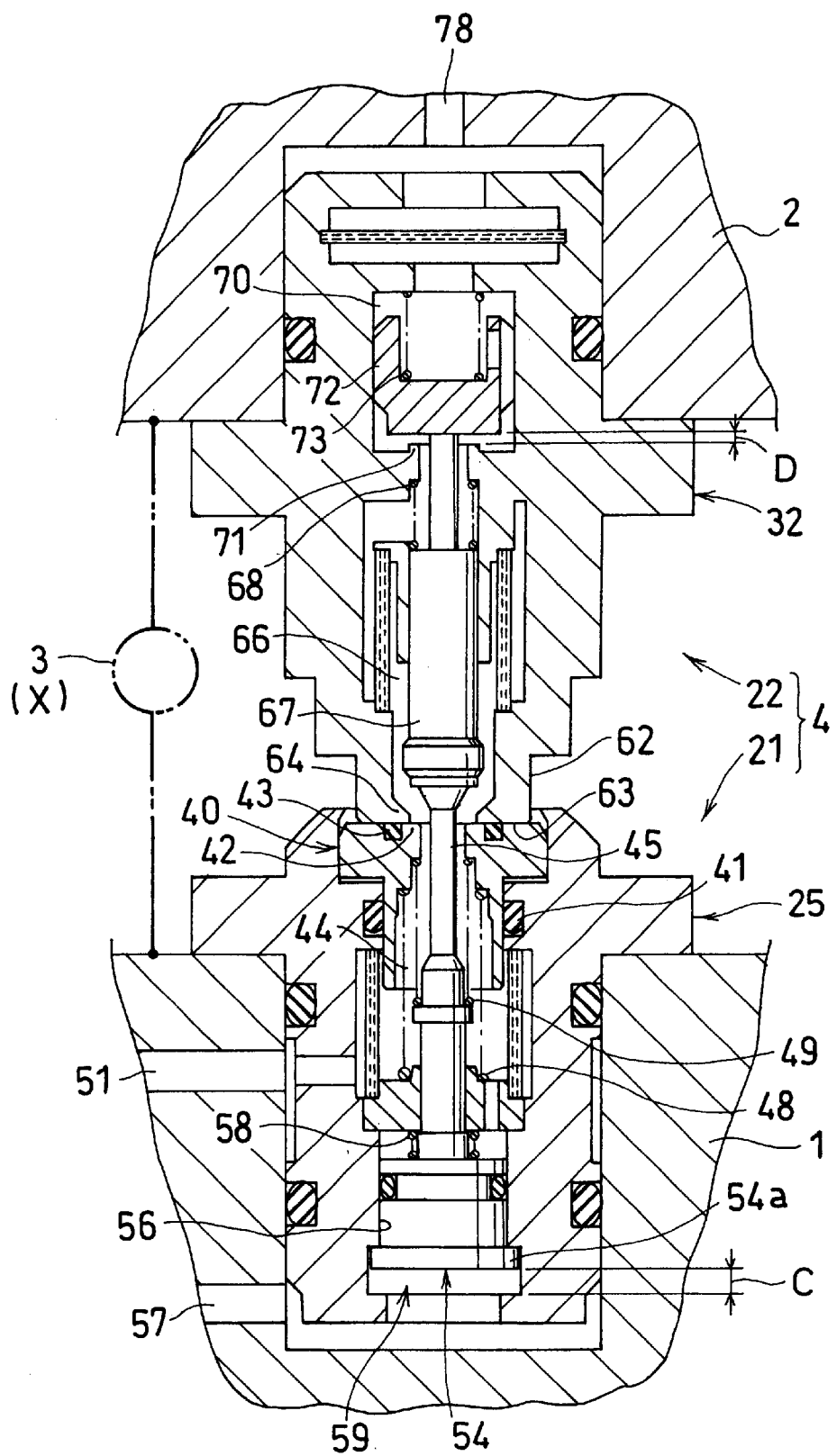

Next, how to use the above-mentioned supply and discharge apparatus is explained by relying on FIGS. 2, 3 and 4.

When supplying pressurized oil from the first supply and discharge port 51 to the second supply and discharge port 78, the supply and discharge apparatus is used as follows.

In a separated state of FIG. 2, the locking means 3 is switched over to an unlocking condition (Y) (see FIG. 1). The first supply and discharge port 51 and the another supply and discharge port 57 have lost the respective pressures. In this state, the work pallet 2 is being lowered to the table 1.

Then, as shown in FIG. 3, the plug 22 has the sealing surface 63 brought into sealing contact with the annular sealing member 43 of the socket 21. The push cylinder 62 downwardly retreats the slide cylinder 40 and the first stop member 45 against the first advance spring 48 and the first closing spring 49. And when the first stop member 45 is received by the piston 54, the first stop valve seat 42 is separated from an upper end of the first stop member 45 and the second stop member 67 has its lower end separated from the second stop valve seat 64.

In a connected state of FIG. 3, the first stop member 45 butts against the second stop member 67, and a contact gap (B) is formed between the second stop member 67 at an opened position and the check member 72 at a closed position. Further, a piston stroke (C) is formed upwards of a stopping flange 54a of the piston 54. The contact gap (B) is set to a value smaller than that of the piston stroke (C).

Next, in that connected state, the locking means 3 has been switched over to the locking condition (X) (see FIG. 1).

Subsequently, the actuation means 59 forcedly opens the check member 72. More specifically, as shown in FIG. 4, the another supply and discharge port 57 supplies to the actuation chamber 56, pressurized oil for forced valve-opening, thereby raising the piston 54. Then the piston 54 separates the check member 72 from the check valve seat 71 through the first stop member 45 and the second stop member 67. There is formed between the check valve seat 71 and the check member 72, an opening gap (D) which is set to a value smaller than that of the piston stroke (C) of the piston 54.

In that state, pressurized oil is supplied to the first supply and discharge port 51. Then the pressurized oil is flowed out to the second supply and discharge port 78 via the first flow passage 44, the second flow passage 66, an interior area of the check valve seat 71 and the check valve chamber 70.

When supplying the pressurized oil, an oil pressure force is applied to an internal sectional area of a sealing portion of the O-ring 41 provided in the slide cylinder 40. The oil pressure force acts upwards to the second housing 32. The acting force is received by the locking means 3 to result in preventing the floating-up of the work pallet 2 from the table 1.

If the pressurized oil supply has been completed, as shown in FIG. 3, first, the pressurized oil at the another supply and discharge port 57 is discharged to an exterior area, thereby enabling the piston 54 to descend by the return spring 58. At the same time, the first stop member 45 and the second stop member 67 descend by the first closing spring 49 and the second closing spring 68 and the check spring 73 brings the check member 72 into closing contact with the check valve seat 71. Thereafter, the pressurized oil at the first supply and discharge port 51 is discharged to the exterior area.

Subsequently, the locking means 3 is switched over from the locking condition (X) to the unlocking condition (Y). In this case, a force which acts from the first housing 25 to the second housing 32 is a weak one which is composed of only the urging forces of the first advance spring 48 and of the first closing spring 49. Therefore, the work pallet 2 does not float up.

Finally, as shown in FIG. 2, the work pallet 2 is raised with respect to the table 1, thereby separating the quick coupler 4. Upon this separation, the quick coupler 4 is separated in a state of stopping the pressurized oil supply to the first supply and discharge port 51. This can inhibit the oil leakage from a connected portion between the annular sealing member 43 of the socket 21 and the sealing surface 63 of the plug 22.

At the time of the foregoing pressurized oil supply, the pressurized oil may be supplied only to the first supply and discharge port 51 without supplying the pressurized oil for forced valve-opening to the another supply and discharge port 57.

Speaking it in more detail, in the connected state of FIG. 3, when pressurized oil is supplied to the first supply and discharge port 51, the pressurized oil pushes and opens the check member 72 and is supplied to the second supply and discharge port 78. Then when the pressure of the second supply and discharge port 78 reaches a set pressure, the check member 72 is brought into closing contact with the check valve seat 71 by the check spring 73. In this state, it is sufficient to stop the pressurized oil supply to the first supply and discharge port 51.

Contrary to the above-mentioned pressurized oil supply, when the pressurized oil at the second supply and discharge port 78 is discharged to the first supply and discharge port 51, the supply and discharge apparatus is used as follows.

Similarly at the time of the pressurized oil supply, first, in the separated state of FIG. 2, the work pallet 2 is lowered to the table 1. Next, as shown in FIG. 3, the quick coupler 4 is connected. Also in this case, each of the first supply and discharge port 51 and the another supply and discharge port 57 has discharged its pressurized oil to the exterior area. Thus the force which acts from the first housing 25 to the second housing 32 is a weak one which is composed of only the urging forces of the first advance spring 48 and of the first closing spring 49. Accordingly, the work pallet 2 does not float up.

Subsequently, the locking means 3 is switched over to the locking condition (X).

Thereafter, the actuation means 59 forcedly opens the check member 72. More specifically, as shown in FIG. 4, pressurized oil for forced valve-opening is supplied from the another supply and discharge port 57 to the actuation chamber 56 to raise the piston 54. Then the piston 54 separates the check member 72 from the check valve seat 71 through the first stop member 45 and the second stop member 67.

This allows the pressurized oil at the second supply and discharge port 78 to be discharged to the first supply and discharge port 51 through the check valve chamber 70, the interior area of the check valve seat 71, the second flow passage 66 and the first flow passage 44.

When the check member 72 is forcedly opened, an upward force for the forced valve-opening acts from the first housing 25 to the second housing 32. However, the upward force is also received by the locking means 3. This can prevent the work pallet 2 from floating up.

Upon completion of the pressurized oil discharge, as shown in FIG. 3, first, the pressurized oil at the another supply and discharge port 57 is discharged to the exterior area, thereby allowing the first stop member 45 and the second stop member 67 to descend by the first closing spring 49 and the second closing spring 68. At the same time, the check spring 73 brings the check member 72 into closing contact with the check valve seat 71.

Subsequently, the locking means 3 is switched over from the locking condition (X) to the unlocking condition (Y).

Finally, as shown in FIG. 2, the work pallet 2 is raised with respect to the table 1, thereby separating the quick coupler 4.

The foregoing embodiment can be modified as follows.

The pressurized fluid to be supplied and discharged between the first supply and discharge port 51 and the second supply and discharge port 78 may be other kinds of liquid and gas such as compressed air instead of the exemplified pressurized oil.

Further, the pressurized fluid to be supplied to the another supply and discharge port 57 also may be other kinds of liquid and gas such as compressed air instead of the exemplified pressurized oil.

The locking means 3 is not limited to the exemplified structure and may adopt various sorts of structures. The locking means 3 may be an exclusive means for fixing the quick coupler 4 instead of employing a means which positions and fixes the work pallet 2 to the table 1 of the machine tool.

The actuation means 59 is not limited to the exemplified fluid pressure actuator but may employ other kinds of actuator such as an electric motor and a solenoid.

A structure for hermetically connecting the socket 21 to the plug 22 of the quick coupler 4 may be formed into a peripheral surface sealing structure instead of the end surface sealing structure which hermetically connects an upper surface of the slide cylinder 40 to a lower surface of the push cylinder 62. The socket 21 may be connected to and separated from the plug 22 in a horizontal direction or an oblique direction instead of the exemplified vertical direction.

The first coupling to be fixed to the table 1 of the machining center was formed by the socket 21 and the second coupling to be secured to the work pallet 2 was defined by the plug 22. However, instead, the first coupling may be formed by the plug 22 and the second coupling may be defined by the socket 21. Further, as a matter of course, the machine tool is not limited to the machining center.

The combination of the first block which fixes the first coupling, with the second block which secures the second coupling, is not limited to the exemplified combination of the table 1 with the work pallet 2. Examples of the alternative combinations are a combination of the table 1 with the clamp, a combination of the work pallet 2 with the clamp and the like.

What is claimed is:

1. A method of supplying and discharging pressurized fluid, the method including a first block (1) which has a first coupling (21) and a first supply and discharge port (51), a second block (2) which has a second coupling (22) and a second supply and discharge port (78), and a locking means (3) which is switched over between a locking condition (X) and an unlocking condition (Y) so as to fix and unfix the first block (1) and the second block (2) to each other, the first coupling (21) having a first stop member (45) within a first flow passage (44), the second coupling (22) having a second stop member (67) within a second flow passage (66), a check valve seat (71), a check member (72) within a check valve chamber (70), and a resilient member (73) which urges the check member (72) toward the check valve seat (71), the method further including an actuation means (59) which forcedly opens the check member (72) against the resilient member (73), when supplying pressurized fluid from the first supply and discharge port (51) to the second supply and discharge port (78), the method comprising the steps of:

first, bringing the first block (1) and the second block (2) closer mutually to thereby hermetically communicate the first flow passage (44) with the second flow passage (66) and bringing the first stop member (45) into butting contact with the second stop member (67) to form a contact gap (B) between the second stop member (67) in that butting contact state, and the check member (72);

next, switching over the locking means (3) to the locking condition (X) to thereby fix the first block (1) and the second block (2) to each other, in that state, supplying pressurized fluid to the first supply and discharge port (51) to thereby supply the pressurized fluid to the second supply and discharge port (78) through the first flow passage (44), the second flow passage (66), an interior area of the check valve seat (71) and the check valve chamber (70); subsequently bringing the check member (72) into closing contact with the check valve seat (71) through an urging force of the resilient member (73); and thereafter, discharging the pressurized fluid at the first supply and discharge port (51) to an exterior area and switching over the locking means (3) from the locking condition (X) to the unlocking condition (Y) to thereby separate the first block (1) and the second block (2) from each other, contrary to the above, when discharging the pressurized fluid supplied to the second supply and discharge port (78) to the first supply and discharge port (51), the method comprising the steps of:

first, bringing the first block (1) and the second block (2) closer mutually to thereby hermetically communicate the first flow passage (44) with the second flow passage (66) and bringing the first stop member (45) into butting contact with the second stop member (67);

next, switching over the locking means (3) to the locking condition (X) to thereby fix the first block (1) and the second block (2) to each other, in that state, separating the check member (72) from the check valve seat (71) by the actuation means (59) through the first stop member (45) and the second stop member (67) in the mentioned order to thereby discharge the pressurized fluid at the second supply and discharge port (78) to the first supply and discharge port (51) through the check valve chamber (70), the interior area of the check valve seat (71), the second flow passage (66) and the first flow passage (44); and thereafter, switching over the locking means (3) from the locking condition (X) to the unlocking condition (Y) to thereby separate the first block (1) and the second block (2) from each other.

2. The method as set forth in claim 1, wherein the actuation means (59) includes a piston (54) which faces the first stop member (45), and an actuation chamber (56), when supplying the pressurized fluid from the first supply and discharge port (51) to the second supply and discharge port (78), the method comprising the steps of:

first, supplying to the actuation chamber (56), pressurized fluid for forced valve-opening to thereby separate the check member (72) from the check valve seat (71) through the piston (54), the first stop member (45) and the second stop member (67) and supplying the pressurized fluid at the first supply and discharge port (51) to the second supply and discharge port (78); and thereafter, discharging the pressurized fluid for forced valve-opening within the actuation chamber (56) to the exterior area and then discharging the pressurized fluid at the first supply and discharge port (51) to the exterior area.

* * * * *